F. B. CHAMBERS.
WEIGHING APPARATUS.
APPLICATION FILED OCT. 26, 1916.
1,296,920.
Patented Mar. 11, 1919.
4 SHEETS—SHEET 4.
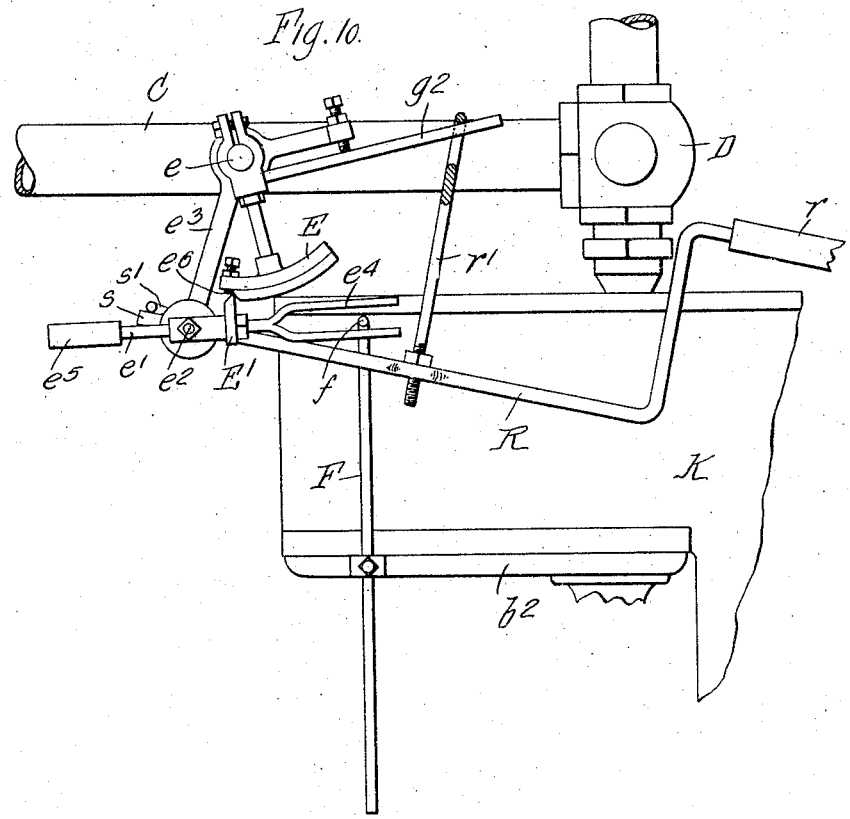
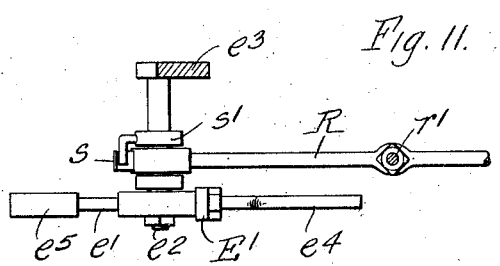
Inventor.
Frank B. Chambers.
by Wilhelm␣Parker,
Attorneys.

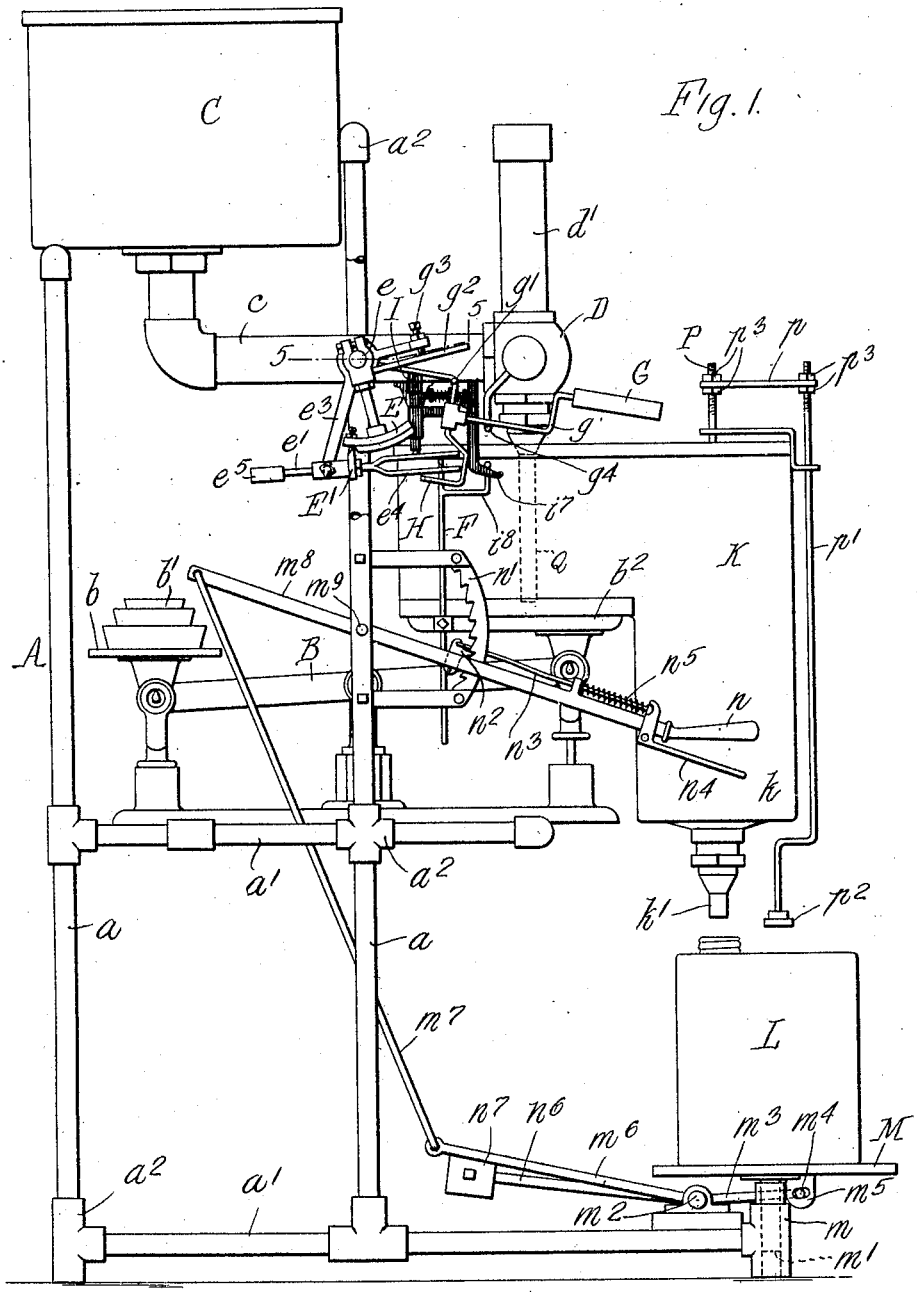

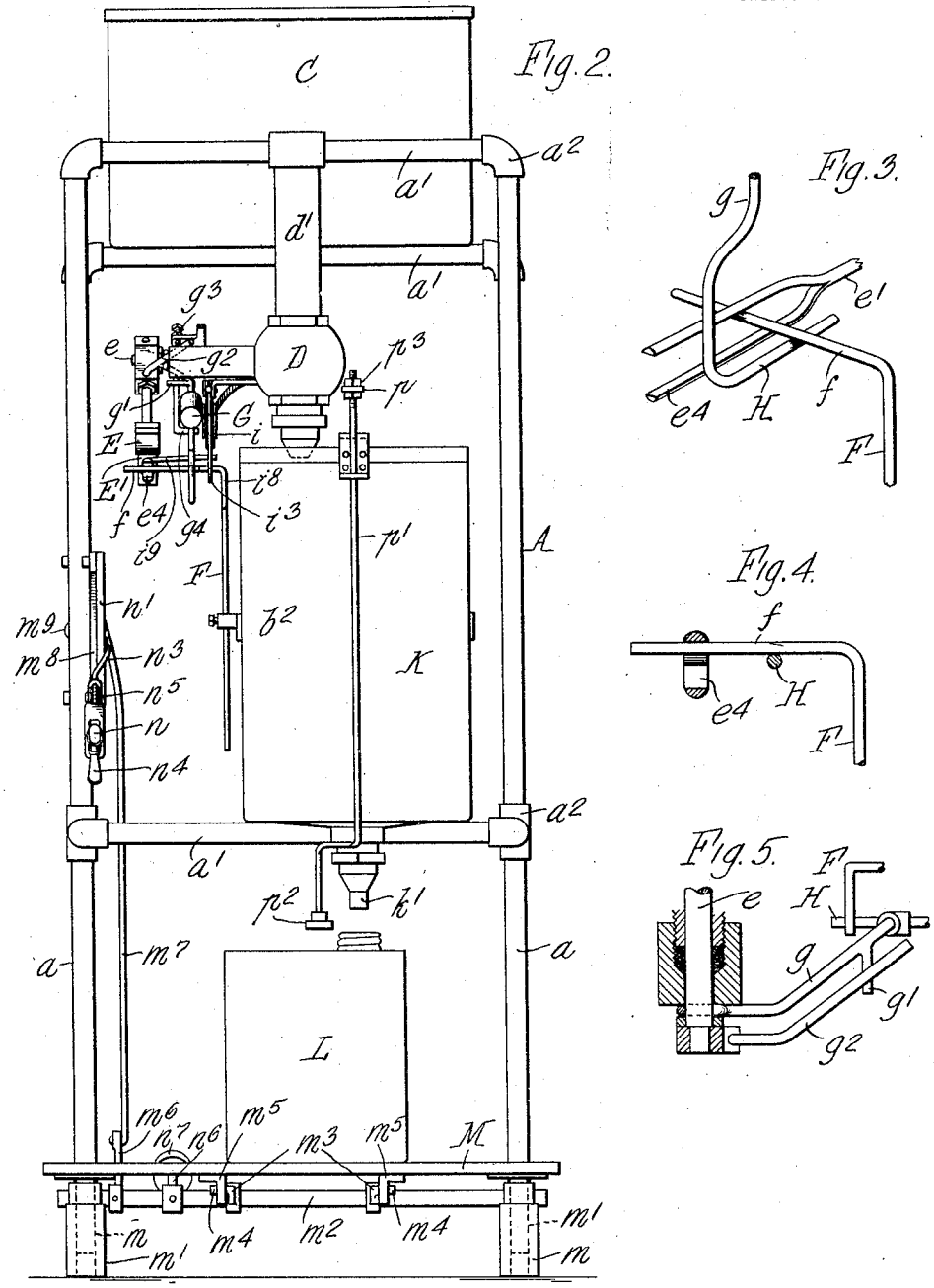

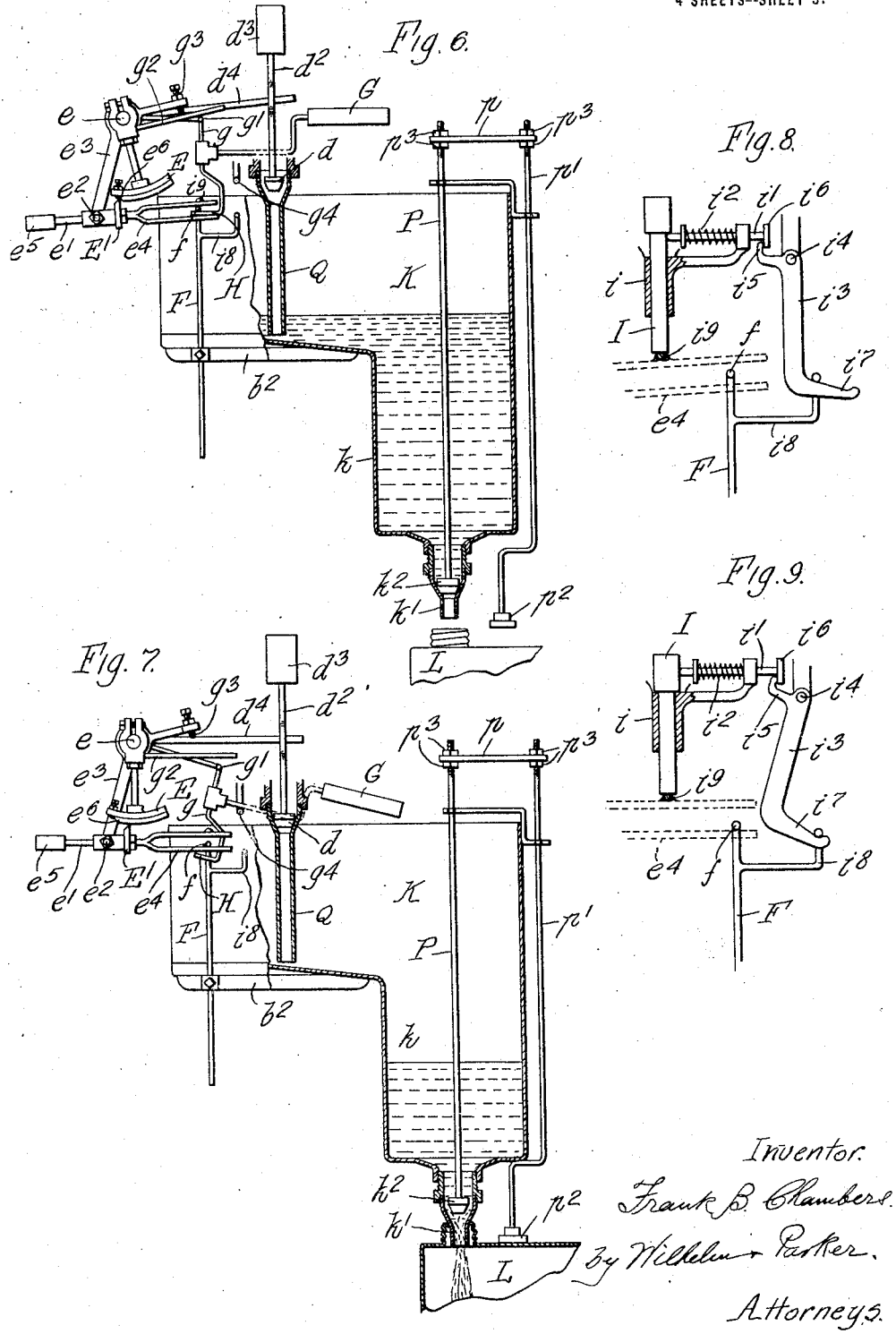

UNITED STATES PATENT OFFICE.

FRANK B. CHAMBERS, OF BUFFALO, NEW YORK.

WEIGHING APPARATUS.

1,296,920.   Specification of Letters Patent.   Patented Mar. 11, 1919.

Application filed October 26, 1916. Serial No. 127,809.

*To all whom it may concern:*

Be it known that I, FRANK B. CHAMBERS, a citizen of the United States, residing at Buffalo, in the county of Erie and State of New York, have invented a new and useful Improvement in Weighing Apparatus, of which the following is a specification.

This invention relates to improvements in weighing apparatus of the kind which is used for filling cans or other receptacles with definite quantities of liquid or other freely flowing substances.

The objects of the invention are to produce an apparatus of this kind which is particularly adaptable for weighing small quantities of material, and for this purpose the apparatus is provided with actuating mechanism which is released by the scale and which actuates trip mechanism for interrupting the flow of liquid to the receptacle which is being filled; also to provide an actuating mechanism of this kind which can be placed into and out of operation so that the valve can be operated either directly through the trip mechanism or through the medium of the actuating mechanism; also to provide means for steadying the scale beam when the weighing operation is commenced so that any oscillatory movement of the scale beam will not affect the accuracy of the apparatus; also to provide a weighing machine of improved construction by means of which a predetermined net weight of liquid or other substance is placed in a container, so that variation in the weight of the containers for the liquid will not affect the amount of liquid placed in the container; also to provide means of improved construction for filling a receptacle with a quantity of liquid which has been weighed; also to provide means for filling receptacles in such a manner as to prevent foaming of the liquid; also to improve apparatus of this kind in other respects hereinafter specified.

In the accompanying drawings:

Figure 1 is a side elevation of a weighing apparatus embodying the invention.

Fig. 2 is a front elevation thereof.

Figs. 3 and 4 are respectively a perspective and a sectional front elevation of a part of the means for steadying the scale beam of the apparatus.

Fig. 5 is a sectional plan view on line 5—5, Fig. 1, of the trip mechanism of the apparatus, on an enlarged scale.

Figs. 6 and 7 are fragmentary side elevations of the apparatus, partly in section, showing the trip mechanism and the means for emptying the liquid from the weighing receptacle into the container, and showing the parts of the mechanisms in different positions.

Figs. 8 and 9 are detached views, on an enlarged scale, of the means for actuating the trip mechanism, showing the parts in different positions.

Fig. 10 is a side elevation, on an enlarged scale, of a mechanism of modified construction for steadying the scale beam.

Fig. 11 is a fragmentary horizontal section thereof.

A represents the frame of the apparatus which may be of any suitable construction and which, in the construction shown, consists of a plurality of upright members $a$ and substantially horizontal members $a'$ connecting the upright members and forming supports for various parts of the apparatus. The frame shown is built up of pipes or tubing connected at the joints by means of suitable pipe fittings $a^2$.

The weighing scale of the apparatus is suitably mounted on the frame A and includes a scale beam B, a weight pan or support $b$ for the weights $b'$, and a scale pan or platform $b^2$ for the substance or receptacle to be weighed. The scale may be of any suitable or desired construction and of itself constitues no part of this invention.

C represents a reservoir of usual construction for the liquid to be weighed. This reservoir is mounted on the upper portion of the frame A and connected by means of a tube or passage $c$ with a valve housing or casing D in which a valve $d$, Figs. 6 and 7, is slidably mounted. The valve and valve housing may be of any suitable construction, the housing shown having an upwardly extending tubular portion $d'$ into which the stem $d^2$ of the valve $d$ enters, and in which a weight $d^3$ adapted to seat the valve $d$ is slidably arranged. The valve $d$ is raised from its seat by means of an arm $d^4$ which engages in a slot in the valve stem $d^2$ and which is rigidly mounted on a shaft or pivot $e$ journaled in and extending through the tube or passage $c$. By turning the pivot $e$ the valve $d$ may be opened or closed.

The actuation of the valve $d$ through the medium of the pivot or shaft $e$ is preferably controlled by means of trip mechanism similar to that shown in my copending application Serial No. 38,643, filed July 8, 1915, and includes a segmental shouldered or detent member E, adjustably secured on the pivot $e$, which coöperates with a detent E' mounted on a lever $e'$ pivoted at $e^2$ on an arm $e^3$ rigidly mounted on the tube $c$ or other fixed part of the apparatus for releasably holding the valve $d$ in its open position while the liquid is being filled into a container or receptacle on the scale pan. The lever $e'$ has a forked or bifurcated portion $e^4$ at one end which is adapted to be engaged by means of a finger or projection $f$ of a trip rod F which is rigidly mounted upon a fixed part of the scale pan or platform $b^2$ and moves therewith. The lever is provided at its other end with a weight $e^5$ which normally holds the detent E' in engagement with a retaining shoulder $e^6$ on the segmental member E. The downward movement of the trip rod F swings the lever $e'$ about the pivot $e^2$, releasing the segmental member E and permitting the weight $d^3$ to move the valve $d$ to its seat. Other means for releasably holding the valve $d$ in its open position may be employed if desired.

The valve $d$ may be opened to permit liquid to enter into the receptacle upon the scale pan by means of a handle G secured to an arm $g$ which is pivoted to move freely about the pivot $e$ independently of the segmental member E. The arm $g$ has a part or finger $g'$ which, when the handle G is moved upwardly, is adapted to engage a valve opening arm or projection $g^2$ rigidly secured on the segmental member E. A stop $g^3$ mounted on the tube or passage $c$ limits the upward movement of the handle and arm $g$, and when the arm is in its upper position the detent E' engages the shouldered portion $e^6$ of the segmental member E. $g^4$ represents a stop suitably secured on a fixed portion of the apparatus, for example on the valve housing D, for limiting the downward movement of the handle G. Other means for placing the valve in its open position may be employed.

In using the apparatus for weighing small quantities of material, it frequently happens that the scale beam when lightly weighted, oscillates or swings back and forth about its pivot or knife edge. In order to prevent this oscillatory movement of the scale pan from affecting the accuracy of the weighing, it is desirable to provide means for steadying the scale pan so that all movement of the same is stopped before the valve is opened to admit liquid into the receptacle on the scale pan. This is accomplished in the construction shown by providing the valve opening handle or device with means adapted to engage a movable portion of the scale, such as the scale pan or the trip rod connected therewith, and to hold the same against movement for a short interval of time, sufficient to stop further oscillation of the scale beam. In the construction shown for this purpose, the arm $g$ is provided with an extension or arm H which is adapted to engage the finger $f$ of the trip rod F to move the trip rod and the scale pan upwardly into engagement with the upper prong of the bifurcated end of the detent lever when the handle G is raised to open the valve. Since it is natural for the operator to hold the handle G in its upper position for a short interval of time, the oscillation of the scale beam will be entirely stopped since the trip rod is held against movement by the arm $g$ and the upper prong of the bifurcated portion of the detent lever. When the handle is dropped to its lower position, as shown in Fig. 7, the projection H is lowered sufficiently to move the same out of the path of movement of the trip rod so as not to interfere in any way with the operation of the weighing and valve actuating mechanisms.

In order to enable the scale to operate accurately on small weights, it is desirable to trip or release the mechanism for holding the valve $d$ open in such a manner that the least possible force will be required on the part of the scale to cause the trip rod to trip or release the valve closing mechanism. In order to accomplish this result an actuating mechanism is provided which may be employed for tripping the valve holding mechanism by moving the lever $e'$ about its pivot to release the segmental member E. In the construction shown this actuating mechanism consists of a hammer or weight which when released is dropped upon a part of the detent lever $e'$. I represents the releasing weight or hammer which is guided in a sleeve $i$ suitably mounted on a fixed part of the apparatus and which is held in its upper position shown in Fig. 8 by means of a latch $i'$ engaging a shouldered portion or sleeve on the hammer or weight I. In the construction shown, the weight or hammer is actuated by gravity but, if desired, other means for normally pressing the weight into a position to release the trip mechanism may be employed. The latch $i'$ is pressed against the hammer by means of a spring $i^2$ and can be released to permit the hammer to drop by any suitable means, preferably actuated by the trip rod of the scale, such, for example, as the bell crank lever $i^3$ pivoted on a pin or bolt $i^4$ and having an arm $i^5$ engaging a head or collar $i^6$ of the latch and an arm $i^7$ which is adapted to be engaged by an extension or part $i^8$ of the trip rod. When the trip rod descends, owing to the downward movement of the scale beam, the bell crank $i^3$ is turned about its pivot $i^4$ and withdraws the latch $i'$ from holding engagement with the hammer, permitting the hammer to drop upon an extension or rod $i^9$ of the detent lever $e'$. When the weight is removed from the scale pan and the trip rod ascends, the finger $f$ of the trip rod moves the bifurcated portion of the detent lever and the extension $i^9$ thereof upwardly, thus moving the hammer into its set position as shown in Fig. 8, in which position it is held by the latch $i'$ and spring $i^2$. The return movement of the latch also brings the bell crank lever back into its operative position. By making the spring $i^2$ small, very little force is required to release the hammer, so that the weighing apparatus will operate with great accuracy.

The actuating mechanism for the valve holding mechanism is preferably so arranged that it can be easily placed out of commission in case the apparatus is used for weighing larger quantities of liquid. In the construction shown, this can be accomplished by removing the bell crank lever $i^3$ by taking out the pivot or pin $i^4$.

The apparatus shown is adapted to weigh the liquid before it is placed into the containers, so that any variation in the weight of the containers will not affect the accuracy with which the liquid is weighed, and so that each container receives a definite net weight of liquid. This is accomplished in the construction shown by providing a weighing receptacle or vessel on the scale pan into which the liquid flows from the valve housing D and in which the liquid is weighed. The net weight of liquid is then discharged into the container. K represents the weighing receptacle, which, in the construction shown, comprises a substantially horizontal portion mounted on the scale pan and a depending portion $k$ which extends below the scale pan and which is provided with a discharge nozzle $k'$ through which the liquid which has been weighed is discharged into a container L, the discharge of liquid from the weighing receptacle being controlled by means of a valve $k^2$.

The container L while being filled is supported upon the platform M which is preferably movable toward and from the discharge nozzle $k'$ of the weighing receptacle. In the construction shown the platform M is guided in its vertical movement by suitable guides, each consisting of a tubular portion $m$ and a plunger $m'$ slidable vertically in the tubular portion. The means for raising and lowering the platform M include a rock shaft $m^2$, suitably journaled on the frame of the apparatus and having arms $m^3$ secured thereto and provided at their outer ends with pins $m^4$ engaging in slots arranged in lugs or projections $m^5$ depending from the platform M. Movement is imparted to the rock shaft $m^2$ by an arm $m^6$ connected by means of a link $m^7$ to a platform shifting lever $m^8$ pivoted at $m^9$ on the frame of the apparatus. The lever is provided with a handle $n$ and means are preferably provided for holding the lever in any desired position. For example, a toothed segment $n'$ may be provided, which is secured on the frame of the machine and is adapted to be engaged by a tooth or dog $n^2$ pivoted on the lever. The tooth or dog is actuated by means of a rod $n^3$ connected with a lever $n^4$ mounted in operative relation to the handle $n$ and yieldingly held in its engaging position by a spring $n^5$. In order to facilitate the raising and lowering of the container, the rock shaft $m^2$ is preferably provided with an arm $n^6$ having adjustably mounted thereon a weight or counterpoise $n^7$ which is adapted to balance the weight of the container L, the platform M and the parts connected therewith.

Means are preferably provided for opening the valve $k^2$ in the weighing receptacle when the container L is raised into operative relation to the discharge nozzle $k'$. For this purpose the valve $k^2$ is provided with an upwardly extending stem P connected by means of an arm or connecting bar $p$ with a rod $p'$ slidably mounted on the side of the weighing receptacle. The lower end of the rod $p'$ is adapted to be engaged by the container L when the same is raised for raising the rod $p'$, valve stem P, and the valve $k^2$ to permit the liquid from the weighing receptacle to drain into the container L. $p^2$ represents a buffer or knob which prevents injury to the container by the end of the rod $p'$. The rod $p'$ is preferably made adjustable with regard to the valve stem P to adapt the apparatus to operate upon containers of different size and shape. For this purpose the upper ends of the valve stem and rod $p'$ are threaded and the connecting bar $p$ is adapted to be adjusted with regard to the valve stem P on the rod $p'$ by means of nuts $p^3$ arranged on the threaded portions of the valve stem and rod.

The apparatus is preferably provided with means for enabling the same to operate on liquids which have a tendency to foam, such, for example, as liquid soap, without causing these liquids to foam excessively so as to interfere with the filling and weighing operations. In the construction shown for this purpose, the discharge nozzle of the valve housing D is provided with a tube Q which extends into immediate proximity to one of the walls of the receptacle or container, for instance, the bottom wall of the weighing receptacle, so that the liquid flows down the tube Q and does not drop or splash against the bottom of the receptacle in such a way as to cause foaming. In the container L, or in case the weighing receptacle is dispensed with, the tube may enter directly into a container or can placed on the scale platform or the tube may be omitted entirely if desired.

If it is desired to use the apparatus without the net weighing attachment, it is merely necessary to remove the weighing receptacle K and the parts mounted thereon from the scale pan, in which case the containers to be filled can be placed directly upon the scale pan under the valve housing D.

In the operation of the apparatus described the handle G is first raised to open the valve $d$ and to set the trip mechanism or valve holding mechanism in position to hold the valve open, in which position the detent E' engages the shouldered portion of the segmental detent member E. The liquid then flows through the tube Q into the weighing receptacle K, the valve $k^2$ of which is closed. The upward movement of the handle G also draws the trip rod F and the scale pan upwardly and holds the scale pan in this position for a short interval of time, which stops any oscillating movement of the scale beam. When sufficient liquid has entered the weighing receptacle, the scale beam B swings about its pivot or knife edge, thus lowering the trip rod and causing the same to actuate the trip mechanism through the medium of the actuating mechanism therefor, including the bell-crank lever $i^3$ and hammer I, or if this actuating mechanism is not employed, the trip mechanism is actuated through the finger $f$ of the trip rod engaging the forked portion of the detent lever $e'$ and swinging this lever about its pivot to withdraw the detent E' from holding engagement with the segmental member E, thus causing the closing of the valve $d$. The operator then raises the handle $n$ of the lever $m^3$ so as to move the container L into operative relation to the discharge nozzle $k'$ of the weighing receptacle. The upward movement of the container L causes the rod $p'$ to raise the valve stem P and to open the valve $k^2$, thus permitting the liquid in the weighing receptacle to enter into the container L. When the container is filled, the handle $n$ of the lever $m^3$ is lowered, thus lowering the container. The handle G is then again raised and the operation is repeated for filling the next container.

By means of this mechanism the liquid entering into the receptacle upon the scale pan is accurately weighed, and, when this liquid is placed into the container or can L, this can will contain a definite net weight of liquid which is independent of the weight of the container. Consequently containers varying in weight can be filled by means of this apparatus without any variation in the weight of liquid placed into the container.

In the modified construction of the apparatus shown in Figs. 10 and 11, alternative means are shown for setting the trip mechanism into position to hold the valve open and for steadying the scale beam. In these figures, the handle $r$ is arranged on an arm R pivoted at $e^2$ on the fixed arm $e^3$ of the trip mechanism. The arm R has an upwardly extending rod or projection $r'$ which is provided at its upper end with a slot or loop into which the valve opening arm $g^2$ of the trip mechanism extends. When the arm R is swung upwardly about the pivot $e^2$, the valve opening arm $g^2$ is swung into a position in which the valve $d$ is opened and in which the detent E' engages the shouldered portion of the segmental member E. The raising of the handle $r$ also causes the arm R to engage the finger or projection $f$ of the trip rod F and move the same upwardly for steadying the scale beam.

The downward movement of the arm R is limited by means of a stop finger or projection $s$ secured on the arm R and adapted to engage a shoulder on the collar $s'$ secured on the pivot $e^2$. The operation of the apparatus with the modified form of valve opening and scale steadying means shown in Figs. 10 and 11 is the same as heretofore described for the mechanism shown in Figs. 1 to 9.

I claim as my invention:

1. In an apparatus for filling receptacles with liquid, the combination of a passage for the liquid, a valve in said passage for controlling the flow of liquid from said passage, means for opening said valve, a scale adapted to cause the closing of said valve, and means on said valve opening means adapted to engage a part of said scale for stopping movement of the scale when said valve is being opened.

2. The combination of a passage for liquid, a valve in said passage for controlling the flow of liquid from said passage, means for opening said valve, a scale on which the liquid is weighed, a detent for holding said valve in its open position, a lever on which said detent is mounted, and means adapted to be released by the movement of said scale for engaging said lever to cause the same to move said detent out of its holding position.

3. The combination of a passage for liquid, a valve in said passage for controlling the flow of liquid from said passage, means for opening said valve, a scale on which the liquid is weighed, a detent for holding said valve in its open position, a lever on which said detent is mounted, a hammer adapted to engage said lever for causing the same to move said detent out of its holding position, a latch for holding said hammer out of engagement with said lever, and means actuated by said scale for releasing said hammer to permit the same to engage said lever to effect the closing of said valve.

4. The combination of a passage for liquid, a valve in said passage for controlling the flow of liquid from said passage, means for opening said valve, a scale on which the liquid discharged from said passage is weighed, a detent for holding said valve in its open position, a hammer adapted to move said detent out of its holding position, a latch for holding said hammer in inoperative position, a bell crank lever connected with said scale and adapted to withdraw said latch from holding engagement with said hammer to permit the hammer to move the detent out of its holding position, said valve opening means being adapted to move said hammer into its inoperative position when the valve opening means are actuated to open the valve.

5. In an apparatus for weighing liquids, the combination of means for supplying liquid to be weighed including a valve for controlling the flow of liquid from said supply means, means for opening said valve, means for holding said valve in its open position, an actuating mechanism for releasing said holding means to permit the valve to close, a scale on which the liquid is weighed, and a trip rod secured on said scale and having a part adapted to engage said actuating mechanism and a part adapted to engage said holding means, said trip rod being adapted to engage said actuating means before moving into engagement with said holding means, said actuating mechanism being adapted to be rendered inoperative to permit the trip rod to act directly upon said holding means.

6. In an apparatus for filling containers with liquid, the combination of a scale, a receptacle secured on said scale for receiving the liquid to be weighed, means for supplying liquid to said receptacle including a valve the closing of which is controlled by said scale when the desired weight of liquid has passed into said receptacle, a discharge valve in said receptacle for controlling the flow of liquid from said receptacle to a container, means for moving said container into operative relation to said receptacle, and means actuated by the container in its movement toward said receptacle to open said discharge valve.

7. In an apparatus for filling containers with liquid, the combination of a scale, a receptacle secured on said scale for receiving the liquid to be weighed and having a discharge opening, means for supplying liquid to said receptacle including a valve, the closing of which is controlled by said scale when the desired weight of liquid has passed into said receptacle, a valve controlling said opening, a support for the container to be filled, means for moving said support toward and from the container, and means for opening said valve when said container has been moved into operative relation to said receptacle.

8. In an apparatus for filling containers with liquid, the combination of a scale, a receptacle secured on said scale for receiving the liquid to be weighed and having a discharge opening, means for supplying liquid to said receptacle including a valve, the closing of which is controlled by said scale when the desired weight of liquid has passed into said receptacle, a platform for supporting the container to be filled, and a hand operated lever connected with said platform for raising the platform to place the container in operative relation to the discharge opening.

9. In an apparatus for filling containers with liquid, the combination of a scale, a receptacle secured on said scale for receiving the liquid to be weighed and having a discharge opening, means for supplying liquid to said receptacle including a valve adapted to be closed by said scale when the desired weight of liquid has passed into said receptacle, a platform for supporting the container to be filled, guides for said platform, and means for raising and lowering said platform to place the container in and out of operative relation to the discharge opening of said receptacle.

10. In a weighing apparatus for filling containers with liquid, the combination of a receptacle adapted to receive a definite weight of liquid, a valve controlling the discharge of liquid from said receptacle, a platform adapted to support the containers to be filled, means for raising said platform to place said containers in position to receive the liquid from said receptacle, and means actuated by the raising of the container into receiving position to open said valve.

11. In a weighing apparatus for filling containers with liquid, the combination of a receptacle adapted to receive a definite weight of liquid, a valve controlling the discharge of liquid from said receptacle, a platform adapted to support the containers to be filled, means for raising said platform to place said containers in position to receive the liquid from said receptacle, a rod connected with said valve and means connected with said rod which are adapted to be actuated by the raising of the container into receiving position to cause the valve to open.

12. In an apparatus for filling receptacles with liquid, the combination of a passage for the liquid, a valve in said passage for controlling the flow of liquid to said receptacle, means for opening said valve, a scale connected with said valve for closing the same, a detent lever for holding said valve open, and a trip rod connected with said scale and having a part adapted to engage said detent lever for permitting the valve to close, said valve opening means having a part adapted to press said part of the trip rod against said detent lever to hold the trip rod against movement.

13. In a liquid weighing apparatus, the combination of a scale adapted to weigh the liquid, a housing having a passage for the liquid, a valve controlling the discharge of liquid from the housing, a valve actuating device extending to the exterior of said housing, a detent adapted to hold said device in a position in which said valve is open, means for adjusting the actuating device relatively to said detent to control the extent to which the valve is opened, and a connection between said scale and said detent to cause the valve to be closed when the desired weight of liquid has passed into said receptacle.

14. In a liquid weighing apparatus, the combination of a housing having a passage for the liquid, a valve controlling the discharge of liquid from the housing, a valve actuating device pivoted on said housing and having a part connected with said valve and a part extending outside of said housing, a shouldered member adjustably secured on said part extending outside of the housing, a detent for holding the shouldered member in position to hold the valve open, and weighing means adapted to engage the detent for causing the valve to close, said shouldered member being adjustable to control the extent to which the valve can be opened.

Witness my hand, this 25th day of October, 1916.

FRANK B. CHAMBERS.

Witnesses:
F. E. PROCHNOW,
A. L. McGEE.

Copies of this patent may be obtained for five cents each, by addressing the "Commissioner of Patents, Washington, D. C."